Dec. 25, 1945.                C. G. DRYER                2,391,399
                        ISOMERIZATION OF PARAFFINS
                           Filed July 6, 1942
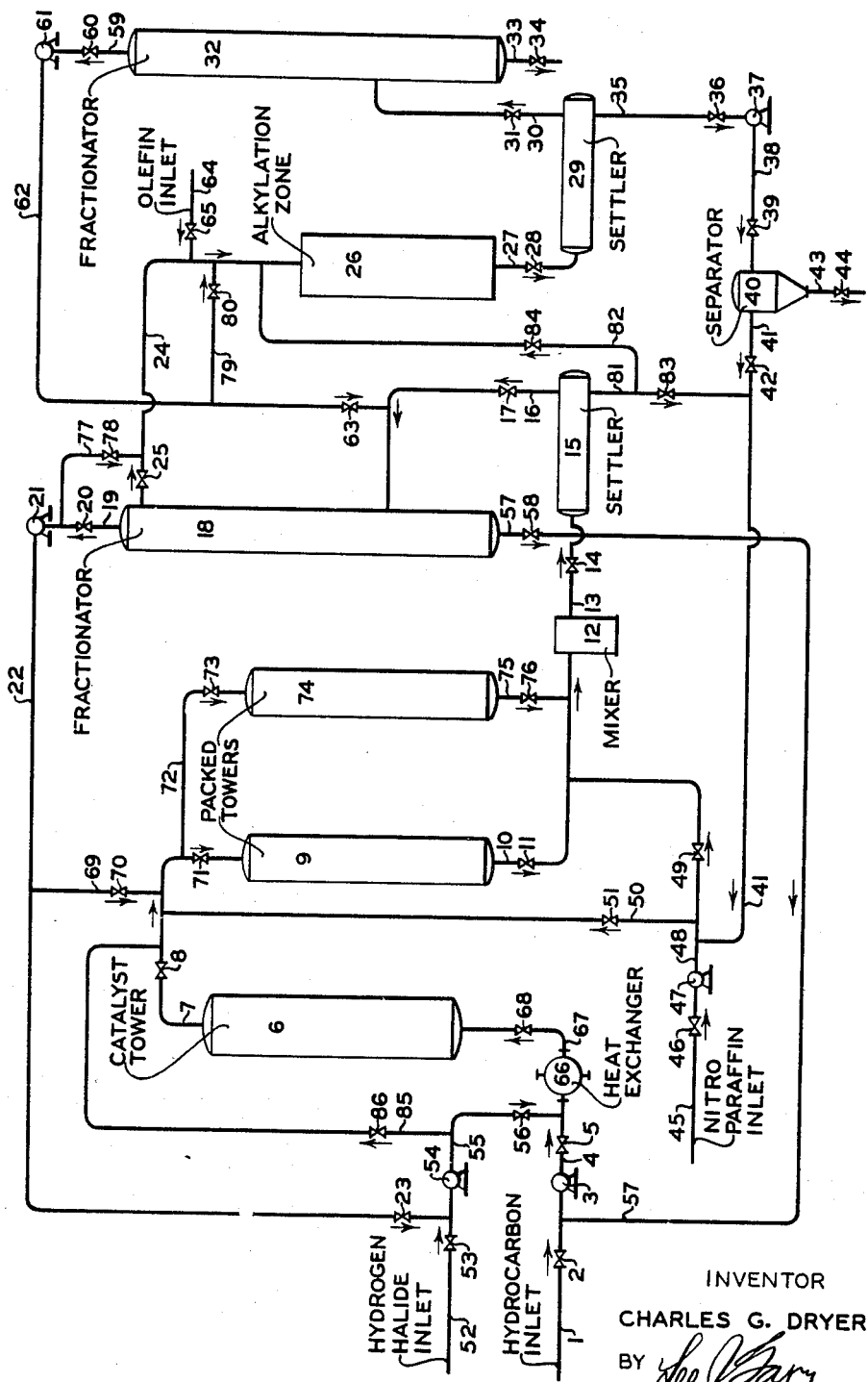
INVENTOR
CHARLES G. DRYER
BY
    ATTORNEY Patented Dec. 25, 1945

2,391,399

UNITED STATES PATENT OFFICE 2,391,399

ISOMERIZATION OF PARAFFINS

Charles G. Dryer, Chicago, Ill., assignor to Universal Oil Products Company, Chicago, Ill., a corporation of Delaware Application July 6, 1942, Serial No. 449,849

6 Claims. (Cl. 260—683.4)

The present invention relates to a combination process for the production of hydrocarbons particularly adaptable for use as motor fuels. More specifically, it is concerned with a process wherein paraffinic hydrocarbons are isomerized to more branched chain paraffins and reacted with olefin hydrocarbons to produce valuable saturated hydrocarbons.

It is well known that alkymers formed by the interaction of isoparaffins and olefins possess physical and chemical characteristics which make these compounds highly desirable as motor fuel. In recent years considerable emphasis has been placed on processes for the isomerization of paraffins to their more reactive isomeric counterparts which are then recovered and alkylated with olefins to form high octane number motor fuels.

The present invention discloses a combination process wherein the isomerization and alkylation reactions are conducted in successive operations which are interdependent upon one another. The cooperation between the individual steps is increased by using the catalyst from the isomerization step in the subsequent alkylation step as will hereinafter be more fully explained.

Another feature of the present invention is the employment of catalysts, which are ordinarily used in the solid form, in solution by dissolving the catalyst in particular types of solvents by the method hereinafter described. An improvement is realized in that better contact between the reactants and catalyst are effected. Further improvement results from operating in accordance with the present invention in that any catalyst which deposits in the isomerization zone may be removed by dissolving it in the particular solvent being used. It is evident, therefore, that if two or more isomerization zones are used, the reaction may be carried out in a substantially continuous manner by alternately introducing the hydrocarbon reactants and solvents into the various isomerization zones. The catalyst dissolved in the solvent is then introduced into the alkylation zone where it is further utilized. This method of operation is particularly effective if packing, upon which the catalyst may deposit, is used in the reaction zone. If the deposition continues for any extensive period of time, there will be an increased pressure drop through the reaction which will finally necessitate discontinuing the operation so that the packing may be cleaned. By operating according to the process herein disclosed these difficulties are eliminated and further advantages realized in that the catalyst removed from the packing in the isomerization zone may be introduced directly into the alkylation zone.

The particular materials with which the present invention is concerned comprise catalysts such as aluminum chloride and bromide dissolved in nitro-paraffin solvents such as nitromethane, nitroethane and nitropropane and others, either alone or mixed with one another. These aluminum halide catalysts are ordinarily promoted by the addition of regulated amounts of hydrogen halides such as hydrogen chloride and hydrogen bromide. The terms aluminum halide and hydrogen halide as used in the specification and the appended claims are intended to include only the chlorides and bromides.

Hydrocarbons which may be treated in the isomerization step of the process will comprise paraffinic hydrocarbons either normal or mildly branched, mixtures of such paraffins or hydrocarbon mixtures containing such paraffins in substantial quantities such as straight-run gasoline or naphtha fractions. The olefinic hydrocarbons used in the alkylation step may be normally gaseous or liquid of either normal or mildly branched chain structure.

In one specific embodiment, the present invention discloses a combination process for the production of a high antiknock motor fuel which comprises contacting a paraffinic hydrocarbon with aluminum chloride under isomerizing conditions, commingling the reaction products with a nitro-paraffin solvent which selectively removes the aluminum chloride from the hydrocarbon mixture, separating said aluminum chloride-nitro-paraffin solution from the hydrocarbons, fractionating the reaction products to remove the desired isomeric hydrocarbon from the unconverted material, commingling said isomeric hydrocarbon with an olefin and subjecting the resulting mixture to contact with the aluminum chloride-nitro-paraffin solution formed as previously set forth, in a reaction zone maintained under alkylating conditions whereby a substantial portion of the paraffinic hydrocarbon is alkylated by the olefin to produce a valuable higher boiling paraffin hydrocarbon.

In the ordinary isomerization operation, considerable difficulty results from the fact that the aluminum halide isomerizing catalyst is soluble to some extent in the reaction products. Upon attempting to cool or condense the reaction products some of the catalyst deposits on the condenser surfaces causing plugging and decreasing the efficiency of the condensing operation. In the process disclosed herein, the aluminum chloride is selectively removed from the reaction products permitting the condensation and fractionation of said reaction products without the difficulties ordinarily encountered.

The operation of the present invention is more clearly defined in the following description of the attached diagrammatic drawing which illustrates in conventional side elevation one type of apparatus in which the objects of the present invention may be accomplished. In order to simplify the description of the operation, such equipment as condensers, furnaces, etc., have been eliminated. To further simplify the description, the hydrocarbons considered shall be normal butane and normal or isobutylenes. However, it must be understood that such limitations are purely for explanatory purposes and do not necessarily place undue limitations upon the present invention.

Referring to the drawing, the hydrocarbon, in this instance, normal butane is introduced through line 4 containing valve 5 wherein it is commingled with hydrogen halide introduced as hereinafter set forth. The resulting mixture is passed through heat exchanger 66 wherein it is raised to a temperature sufficient to compensate for any losses due to radiation, conduction or convection during the passage of the reactants from the heat exchanger through line 67 and valve 68 to catalyst tower 6 and still maintain the desired reaction temperature in said catalyst tower. The temperature to which the hydrocarbon is raised in heat exchanger 66 is dependent primarily upon the type of catalyst used, the hydrocarbon being charged, and the percentage of hydrogen halide activator being used. Ordinarily this temperature will be within the approximate range of 50 to 350° F. and preferably within the range of 125 to 250° F. The hydrogen halide concentration will vary depending upon the other operating conditions chosen, but will ordinarily be within the range of about 1 to 30 mol per cent of the hydrocarbon-hydrogen halide mixture. The pressure under which tower 6 will be maintained will be dependent upon the hydrocarbon charged, but will ordinarily be sufficient to maintain the hydrocarbon in substantially liquid phase under the temperature of operation.

It has been found that the presence of hydrogen in the reaction zone in amounts of the order of 1 to 30 mol per cent of the hydrocarbon charged effectively suppresses any undesired side reactions. This is particularly true with paraffin hydrocarbons which are normally liquid such as pentane, hexane, etc.

The aluminum halide catalyst disposed in catalyst tower 6 in this instance is aluminum chloride and is utilized in the granular form. The reaction products leave catalyst tower 6 through line 7 containing valve 8 and are directed either through line 72 and valve 73 into tower 74, or into tower 9 through valve 71, depending upon which reaction zone is being utilized at that particular time. In order to simplify the explanation let it be considered that tower 9 is being utilized for the completion of the isomerization reaction. Towers 9 or 74 may be packed with any solid inert material, such as silica-alumina, acid treated clay, crushed fire brick and metals possessing high surface such as spongy iron, or they may be large empty chambers which will provide sufficient time to complete the desired reaction. The stream of hydrocarbons leave reactor 9 through line 10 containing valve 11 (or when reactor 74 is being used they leave through line 75 and valve 76) and are commingled with a nitro-paraffin solvent introduced through line 45 containing valve 46, pump 47 and line 48 containing valve 49. The nitro-paraffin selectively removes most or substantially all the aluminum chloride contained in the reaction products from reactor 9 and the resulting solutions along with hydrocarbons are conveyed into mixer 12, wherein violent agitation is used to insure complete contacting of the solvent with the aluminum chloride-containing hydrocarbons.

The hydrocarbons and nitro-paraffin-aluminum chloride mixtures leave mixer 12 through line 13 containing valve 14 and are introduced into settler 15 wherein the aluminum chloride nitro-paraffin solution is separated from the hydrocarbons. A portion of the aluminum chloride-nitro-paraffin solution is recycled to line 48 through line 81 containing valve 83 to increase the aluminum chloride concentration in the nitro-paraffin solution. The separated hydrocarbons are withdrawn through line 16 containing valve 17 and are introduced into fractionator 18 wherein the iso-butane, ordinarily containing small amounts of hydrogen chloride, is withdrawn through line 24 containing valve 25 and is directed into alkylation zone 26 along with olefins which are introduced through line 64 containing valve 65 and the aluminum chloride-nitro-paraffin solution which is withdrawn from settler 15 through line 81 into line 82 containing valve 84.

The iso-paraffin olefin ratio maintained in alkylation zone 26 is ordinarily within the range of from about 2 to 1 to about 20 to 1. The temperature utilized in the alkylation zone will vary depending upon the activity of the catalyst, particular type of hydrocarbon charge and the contacting time of the hydrocarbons and the catalyst being utilized, but will be ordinarily within the range of −50 to 160° F. Generally speaking, the lower temperatures are utilized for the alkylation of iso-butane with butylenes and the higher temperatures when propenes are used. Alkylation zone 26 may comprise a packed chamber containing such packing materials as porcelain, pumice, fire brick, quartz, kaolin, raw and acid treated clay, silica gel, alumina, magnesia, zirconia and others. On the other hand, alkylation zone 26 may comprise a vessel wherein contact is obtained by vigorous agitation such as in the so called turbo mixers, centrifugal mixers, etc.

The reaction products leave alkylation zone 26 through line 27 containing valve 28 and are directed into settler 29 wherein the aluminum chloride-nitro-paraffin solution is separated from the hydrocarbons. The hydrocarbons are withdrawn through line 30 containing valve 31 and enter fractionator 32 wherein the alkylate is separated from the unconverted material. The alkylate is withdrawn through line 33 containing valve 34, cooled and sent to storage. The unconverted material, principally iso-butane and hydrogen chloride is withdrawn through line 59 containing valve 60 by compressor 61 which discharges through line 62 containing valve 63 into line 16. Portions of this stream may be withdrawn through line 79 containing valve 80 and recycled through line 24 into alkylation zone 26. The aluminum chloride nitro-paraffin solution separated in settler 29 is withdrawn through line 35 containing valve 36 into pump 37 which discharges through line 38 containing valve 39 into a nitro-paraffin recovery zone 40 wherein the nitro-paraffin is separated from any heavy aluminum chloride-hydrocarbon sludge formed during the reaction. This sludge is withdrawn through line 43 containing valve 44 and may be treated to recover the aluminum chloride contained therein or may be used to pretreat the paraffin charging stocks to remove any olefins or aromatics present therein. The remaining aluminum chloride-nitro-paraffin solution is withdrawn from separator 40 through line 41 containing valve 42 and is recycled back into line 48 along with the portion which was originally withdrawn from settler 15 through valve 83.

Hydrogen halide, in this instance hydrogen chloride, removed from fractionator 18 through line 19 containing valve 20 is ordinarily withdrawn through compressor 21 and discharged through line 22 containing valve 23 back into line 52. However, a portion may be withdrawn through line 77 containing valve 78 and introduced into line 24. A portion of the recycled hydrogen chloride may be withdrawn from line 22 to line 69 containing valve 70 and introduced into line 7 to increase the concentration of hydrogen chloride contained therein. The point of introduction of the hydrogen halide will determine the particular zone in which the major portion of isomerization will occur. Ordinarily it is desirable to have the reaction occur in tower 6. However, under certain circumstances, for example, if the charge contains considerable impurities which may react with the catalyst to increase its consumption, the hydrogen chloride may be introduced through line 85 valve 86 and line 7 into either tower 9 or 74 depending upon which is being used. Alternatively, the reaction may be started in tower 6 and completed by additional contact time at higher hydrogen chloride concentration in either zone 9 or 74. During the course of this operation, the particular packing material in tower 9 or 74 may become coated with a layer of aluminum chloride or aluminum chloride-hydrogen complex which would tend to decrease the efficiency of the process and possibly necessitate the termination of the operation. This may be avoided by introducing the nitro-paraffin solvent into the top of the reaction zone through line 50 containing valve 51. In the passage of the nitro-paraffin solvent through the packed reactor a solution of aluminum chloride and nitro-paraffin will be formed which can be used in a subsequent alkylation reaction and which effectively cleans the packing material and permits its further use.

The novelty and utility of the process of this invention are evident from the preceding description of one method of operation, although it is not intended that this description unduly limit its generally broad scope.

I claim as my invention:

1. A process for producing saturated branched chain hydrocarbons which comprises subjecting a less branched chain paraffin to contact with an aluminum halide catalyst in the presence of hydrogen halide under isomerizing conditions, commingling the reaction products with a nitro-paraffin solvent, separating the desired isomeric hydrocarbon from unconverted hydrocarbon and the aluminum halide-nitro-paraffin solution, commingling said separated isomeric hydrocarbon with olefinic hydrocarbons and contacting the mixture in the presence of hydrogen halide under alkylating conditions with the aluminum halide nitro-paraffin solution formed as previously set forth.

2. A process for the production of saturated branched chain hydrocarbons which comprises subjecting a less branched chain paraffin to contact with an aluminum chloride catalyst in the presence of hydrogen chloride under isomerizing conditions, commingling the reaction products with a nitro-paraffin solvent, separating the desired isomeric hydrocarbon from unconverted hydrocarbon and the aluminum chloride nitro-paraffin solution, commingling said separated isomeric hydrocarbon with olefinic hydrocarbons and contacting the mixture in the presence of hydrogen chloride under alkylating conditions with the aluminum chloride nitro-paraffin solution formed as previously set forth.

3. A process for the production of saturated branched chain hydrocarbons which comprises subjecting a less branched chain paraffin to contact with an aluminum bromide catalyst in the presence of hydrogen bromide under isomerizing conditions, commingling the reaction products with a nitro-paraffin solvent, separating the desired isomeric hydrocarbon from unconverted hydrocarbon and the aluminum bromide nitro-paraffin solution, commingling said separated isomeric hydrocarbon with olefinic hydrocarbons and contacting the mixture in the presence of hydrogen bromide under alkylating conditions with the aluminum bromide nitro-paraffin solution formed as previously set forth.

4. A process for the production of saturated branched chain hydrocarbons which comprises subjecting a less branched chain paraffin to contact with an aluminum halide catalyst in the presence of hydrogen halide under isomerizing conditions, commingling the reaction products with a nitro-paraffin solvent, separating the desired isomeric hydrocarbon from the unconverted hydrocarbon and the aluminum halide-nitro-paraffin solution, recycling a portion of the aluminum halide nitro-paraffin solution to contact with the reaction products of the isomerization zone, thereby increasing the aluminum halide concentration of said portion, commingling the separated isomeric hydrocarbons with olefinic hydrocarbons and contacting the mixture in the presence of hydrogen halide under alkylating conditions with the aluminum halide nitro-paraffin solution containing a high concentration of aluminum halide formed as previously set forth.

5. A process for the production of saturated branched chain hydrocarbons which comprises subjecting a paraffin hydrocarbon to contact with an aluminum halide catalyst at a temperature of from about 50 to about 350° F. and in the presence of an amount of hydrogen halide sufficient to cause isomerization of the paraffin hydrocarbon as the predominating reaction, commingling the reaction products with a nitro-paraffin solvent, separating the desired isomeric hydrocarbon from the unconverted hydrocarbon and the aluminum halide-nitro-paraffin solution, commingling said separated isomeric hydrocarbon with olefinic hydrocarbons and contacting the mixture in the presence of hydrogen halide at a temperature of from about —50 to about 160° F. with the aluminum halide nitro-paraffin solution formed as previously set forth.

6. A hydrocarbon conversion process which comprises subjecting a paraffinic hydrocarbon to isomerization in the presence of an aluminum halide catalyst, thereby forming a reaction mixture containing isomerized paraffin, unconverted paraffin and aluminum halide, commingling a nitro-paraffin solvent with said reaction mixture to form a solution of aluminum halide in said solvent, separating the resultant aluminum halide-nitro-paraffin solution from undissolved hydrocarbons, fractionating the latter to separate the isomerized paraffin from unconverted paraffin, commingling an olefin with the separated isomerized paraffin and subjecting the resultant mixture to alkylating conditions in the presence of at least a portion of said aluminum halide-nitro-paraffin solution.

CHARLES G. DRYER.